United States Patent Office 3,487,026
Patented Dec. 30, 1969

3,487,026
TREATMENT FOR CRACKING CATALYST
Eugene F. Schwarzenbek, 20 Randall Drive,
Short Hills, N.J. 07078
No Drawing. Filed Aug. 30, 1966, Ser. No. 575,950
Int. Cl. B01j *11/40*
U.S. Cl. 252—410                                3 Claims

ABSTRACT OF THE DISCLOSURE

A process for treating a hydrocarbon cracking catalyst in a gelatinous form which includes heating the gelatinous catalyst at a temperature between 300 to 575° F. and at a pressure between about 5–100 atmospheres for a period of time ranging from about 1–72 hours to produce a gelatinous catalyst having an average pore diameter ranging between about 100–225 A.

---

This invention relates to the catlytic conversion of hydrocarbons and more particularly to the treatment of catalysts used in hydrocarbon conversion operations. The instant invention is especially concerned with a process for improving the activity and stability of a hydrocarbon conversion catalyst by contacting the catalyst with an aqueous medium such as steam or water at an elevated temperature and pressure prior to its initial introduction or use in a hydrocarbon conversion operation.

In conventional processes for the catalytic cracking of hydrocarbon oils, the feed stock, usually a gas oil, is contacted in the vapor state with a cracking catalyst at temperatures of about 800 to 1250° F. and pressures ranging from subatmospheric to 50 p.s.i.g. or higher. At these operating conditions, especially at these high temperatures, the activity and stability of the catalyst is seriously impaired and after extensive use in the catalytic cracking unit the catalyst may exhibit only one or two tenths the activity level of a fresh catalyst feed to the unit.

Efforts heretofore have been made to determine the reasons for this loss in activity during use and fundamental studies have been carried out by many investigators on the physical, chemical and catalytic characteristics of cracking catalysts. It has been found, for instance, that for a given catalytic material the surface area can be used as a reliable index of catalytic activity although it will be recognized that a synthetic catalyst usually has a different activity than a natural catalyst of the same surface area. Factors which affect the surface area of a catalyst include temperature, partial pressure of steam and time, especially in the case of silica-alumina cracking catalysts. It has also been found that the chemical composition of a catalyst, and its pore size, as well as the manner of producing it also affect its stability characteristics. Thus, for instance, in a silica-alumina catalyst system, it has been observed that a catalyst with a high alumina content is more stable than one with a low alumina content and that catalysts with large pore diameters are more stable than those with small pore diameters.

As a result of these fundamental investigations of the various factors which affect the catalyst activity and stability, manufacturers have tailored the production of catalysts to meet the varied demands of the oil refining industry by producing a number of different grades of catalytic material. Accordingly, considerations have been given to the improvement of catalytic activity while attempting to keep at a minimum the cost of the catalyst. Representative commercial cracking catalysts having the following physical charactristics are:

|                        | Synthetic | Semi-Synthetic Natural |
|------------------------|-----------|------------------------|
| Surface area (m.²/g.)  | 350–700   | 150–350                |
| Pore volume (cm.³/g.)  | 0.65–0.9  | 0.3–0.65               |
| Pore diameter (A.)     | 45–80     | 70–95                  |

Samples of catalysts withdrawn from over 65% of the fluid cracking units in the United States and Canada show as averages a surface area 122 m.²/g., a pore volume of 0.42 cm.³/g. and a pore diameter of 138 A. It is also known that, generally, the amount of catalyst required in commercial cracking units to maintain the desired activity level vary between about 0.1–0.4 lb./bbl. of fresh hydrocarbon feed or between about 0.25–3 lb./day/100 lb. of unit catalyst inventory. It can thus be seen that even with a catalyst tailored to provide improved activity and stability characteristics the catalyst requirements in commercial units are still high.

It is therefore a principal object of the instant invention to provide a hydrocarbon cracking catalyst exhibiting improved activity and stability.

Another object of the instant invention is to provide an improved process for the catalytic conversion of hydrocarbons.

Still another object of the instant invention is to provide a process for improving the activity and selectivity of a catalyst prior to its introduction or use in the catalytic conversion of hydrocarbons.

Yet another object of the instant invention is to provide an improved hydrocarbon conversion operation whereby the catalyst make up rate required is significantly reduced.

These and other objects of the invention will become more readily apparent from the following detailed description and discussion.

The invention is applicable in general to the catalytic cracking of hydrocarbon oils and in particular petroleum fractions such as gas oils, either light or heavy, fuel oils, distillates, crude residuums, a crude oil, a reduced crude oil, or other suitable hydrocarbon material. The catalytic cracking of such hydrocarbons is carried out conventionally in a vessel containing a dense phase bed of fluidized catalyst superposed by a dilute phase. Hydrocarbon feed material and catalyst treated in accordance with this invention are introduced into the dense phase bed, the feed and/or catalyst being at a sufficient temperature to promote the desired cracking in the reaction vessel. The reaction is usually carried out in a temperature range of between 600 and about 1250 F., the particular temperature employed depending on the catalyst used and the feed material. The relative quantities of catalyst and hydrocarbon feed are controlled to provide a superficial velocity in the catalytic reaction zone generally between 0.5 and about 5 feet per second and usually between about 1.5–3 feet per second. Also the catalyst to oil ratio is generally maintained between about 4 to 1 and about 10 to 1 pounds per pound while the weight space velocity can vary between about 3–15 pounds of hydrocarbon feed per hour per pound of catalyst in the reaction vessel. The pressure during the cracking operation can vary between subatmospheric to pressures as high as 100 lbs. or higher. The dense phase is generally characterized by containing between about 5–35 pounds of solids per cubic foot while the dilute phase generally contains about 0.001–0.02 pound of catalyst per cubic foot.

In carrying out the instant invention, before the catalyst is introduced in the reaction zone, the catalyst is contacted with steam at a temperature between 212° F. and 1300° F. under superatmospheric pressure for a time sufficient to substantially increase the average pore diameter to a value between 100–225 A. Preferably the steam treatment will be carried out at a temperature between 700–1100° F. and at a pressure ranging between 2–40 atmospheres for about 1–72 hours, preferably 1–48 hours. During such treatment the surface area of the catalyst will be reduced at least 10% but less than 75%. Preferably the catalyst treated in accordance with this invention has a surface area which is at least 50% of the surface area thereof prior to the steaming operation.

The catalyst employed in this invention can be a natural or synthetic catalyst or mixtures thereof. A natural catalyst can be prepared by the acid activation of various clays, such as Fuller's earth and bentonitic clays such as montorillonite clay. Synthetic catalysts derived from silica gel or other forms of silica acid, for example silica-alumina or silica-magnesia with or without suitable additions of other active components such as zirconia, thoria or the like can be employed. Examples of typical synthetic catalysts include such materials as silica-alumina, silica-boria, silica-alumina-boria, silica-thoria, silica-zirconia, silica-alumina-zirconia, silica-magnesia, alumina-boria, silica-alumina-beryllia, silica-boria-magnesia, silica-alumina-thoria, etc. Desirably the catalyst contains particles having a size varying from about 1–200 microns.

The invention is illustrated by way of the following examples.

Five samples of a fresh silica-alumina catalyst designated in Table I below as Examples 1–5 were treated in the following manner. Example 1 was reserved for comparison while Examples 2–5 were steam treated at 900° F. at the pressures and time indicated. The untreated catalyst of Example 1 when used in a hydrocarbon conversion operation required a make up rate of 0.52% per day on inventory to maintain an equilibrium surface area of 100 m.²/g.

TABLE I

| Example | 1 | 2 | 3 | 4 | 5 |
| --- | --- | --- | --- | --- | --- |
| Steam treatment: | | | | | |
| Temp (° F.) | None | 900 | 900 | 900 | 900 |
| Pressure (atm.) | | 6 | 13 | 20 | 20 |
| Time (hrs.) | | 24 | 24 | 24 | 60 |
| Catalyst: | | | | | |
| Surface area (m.²/g.) | 440 | 281 | 187 | 141 | 125 |
| Pore dia. (A.) | 80 | 120 | 175 | 225 | 250 |
| Equilibrium catalyst: Surface area (m.²/g.) | 100 | 100 | 100 | 100 | 100 |
| Catalyst make-up rate: Percent per day | 0.52 | 0.33 | 0.16 | 0.28 | 0.95 |

These data show that the steam treatment must be carefully controlled since the increase in pore diameter is accompanied by a loss in surface area. It can be seen that if the treatment is too severe, i.e. the pore diameter is enlarged too much the accompanying decrease in surface area was too great. Hence the beneficial results of enlarging the pore diameter were negated. As seen in Examples 2 and 3, the severity of the treatment was increased by raising the steam pressure so that the pore diameter increased from 80 A. to 120 A. to 175 A. although at the same time the surface area decreased from 440 m.²/g. to 281 m.²/g. to 187 m.²/g. respectively. The treatment, however, was surprisingly effective in that the catalyst make up requirement decreased from 0.52%/day to 0.33%/day to 0.16%/day. In Example 3 a three fold decrease in catalyst make up was realized even though 57% of the surface area had been destroyed during the treatment.

In Examples 4 and 5, the severity of the treatment was further increased to increase the pore diameters to 225 A. and 250 A., respectively. The required catalyst make up rate, however, increased from the optimum minimum of 0.16%/day in Example 3 to 0.28%/day and 0.95%/day of Examples 4 and 5, respectively. It is thus apparent that the treatment can be applied within specific ranges since an uncontrolled treatment results in a catalyst whose make up rate is significantly higher than an untreated catalyst.

It has also been found that in addition to the severity of the treatment as measured by the increase in pore volume, the temperature of the steam treatment is also a critical factor as shown in the following examples.

Three additional samples of silica-alumina catalytic material, essentially the same as that employed in Examples 1–5 above, were steam treated at the temperatures indicated in Table 2 below. The data obtained is compared with the characteristics of the catalyst treated in Examples 1 and 3 above.

TABLE II

| Example | 1 | 3 | 6 | 7 | 8 |
| --- | --- | --- | --- | --- | --- |
| Steam treatment: | | | | | |
| Temp (° F.) | None | 900 | 1,100 | 1,300 | 1,300 |
| Pressure (atm.) | | 13 | 7 | 3 | 3 |
| Time (hrs.) | | 24 | 13 | 24 | 48 |
| Catalyst: | | | | | |
| Surface area (m.²/g.) | 440 | 187 | 187 | 187 | 163 |
| Pore dia. (A.) | 80 | 175 | 165 | 157 | 175 |
| Equilibrium catalyst: | | | | | |
| Surface area (m.²/g.) | 100 | 100 | 100 | 100 | 190 |
| Catalyst make-up rate: | | | | | |
| Percent per day | 0.52 | 0.16 | 0.39 | 0.72 | 1.1 |

From the above data it will be observed that when the treating temperature is increased to 1100 and 1300° F. in Examples 6–8, the growth in the pore diameter and the stability of the catalyst is less than when the treatment is effected at 900° F. in Example 3, whereas the treatment at 900° F. provided a substantial reduction in the make up catalyst requirements, i.e. from 0.52% per day to 0.16% per day. However, when the treatment temperature is increased to 1100° F. the improvement was less while when the treatment temperature was increased to 1300° F. the make up requirement was significantly greater than an untreated catalyst. As can be seen a treatment at 1300° to either the surface area value or the pore diameter value of the catalyst treated at 900° F. yielded unfavorable results.

It has also been found that the steam treatment of this invention is not significantly dependent on the pressure utilized. It is of course desirable to utilize superatmospheric pressure since, as can be seen from the data in Table 3, the treatment time is significantly reduced at pressures greater than atmospheric. In Table 3, samples designated as Examples 9–12 were steam treated at varying pressures and the results are compared with the untreated catalyst of Example 1.

TABLE III

| Example | 1 | 9 | 10 | 11 | 12 |
|---|---|---|---|---|---|
| Steam treatment: | | | | | |
| Temp (° F.) | None | 1,100 | 1,100 | 1,100 | 1,100 |
| Pressure (atm.) | | 1 | 3 | 7 | 7 |
| Time (hrs.) | | 1,000 | 30 | 2 | 13 |
| Catalyst: | | | | | |
| Surface area (m.²/g.) | 440 | 281 | 281 | 281 | 185 |
| Pore dia. (A.) | 80 | 117 | 117 | 117 | 167 |

These data show that steam pressures in excess of 1 atmosphere, preferably at least 2 atmopheres are desirable to obtain a short time treating operation.

The beneficial results of the instant invention when applied to any given catalyst are also dependent on the equilibrium catalyst surface area desired to be maintained during the hydrocarbon conversion operation. This phenomenon is illustrated in Examples 13-15 as reported in Table IV below. In these examples samples of a fresh silica alumina catalyst essentially the same as that used in Example 1 were equally steam treated to produce a catalyst having essentially the same surface area and pore diameter characteristics as Example 3 above. The samples were then tested to determine the make up requirements at varying levels of equilibrium catalyst surface area maintained in the cracking zone.

These makeup requirements were then compared with those using the same but untreated catalyst material and at the same varying levels of equilibrium catalyst surface areas.

TABLE IV

| Example | 3 | 13 | 14 | 15 |
|---|---|---|---|---|
| Untreated catalyst: | | | | |
| Surface area (m.²/g.) | 440 | 440 | 440 | 440 |
| Pore dia. (A.) | 80 | 80 | 80 | 80 |
| Equilibrium catalyst: Surface area (m.²/g.) | 100 | 75 | 125 | 150 |
| Catalyst make-up rate: Percent per day | 0.52 | 0.12 | 1.73 | 4.4 |
| With steam treatment: | | | | |
| Temp (° F.) | 900 | 900 | 900 | 900 |
| Pressure (atm.) | 13 | 13 | 13 | 13 |
| Time (hrs.) | 24 | 24 | 24 | 24 |
| Catalyst: | | | | |
| Surface area (m.²/g.) | 187 | 187 | 187 | 187 |
| Pore dia. (A.) | 175 | 175 | 175 | 175 |
| Equilibrium catalyst: Surface area (m.²/g.) | 100 | 75 | 125 | 150 |
| Catalyst make-up rate: | | | | |
| Percent per day | 0.16 | 0.0024 | 4.0 | 55.5 |
| Ratio, treated/untreated | 0.31 | 0.02 | 2.3 | 12.6 |

These data show that in order to maintain a high equilibrium catalyst surface area value in a reaction zone, i.e. over about 125 m.²/g. for any given catalyst, the fresh catalyst to be treated should have a surface area greater than 440 m.²/g. and/or an average pore diameter greater than 80 A. This phenomenon is brought out more clearly in runs 16-18 reported below in Table V.

In these run samples of an alumina-silica catalyst having varying pore diameters and surface areas were tested and compared with essentially equal samples which were treated in accordance with the instant invention.

TABLE V

| Example | 3 | 16 | 17 | 18 |
|---|---|---|---|---|
| Untreated catalyst: | | | | |
| Surface area (m.²/g.) | 440 | 550 | 660 | 440 |
| Pore dia. (A.) | 80 | 80 | 80 | 100 |
| Equilibrium catalyst: Surface area (m.²/g.) | 100 | 125 | 150 | 125 |
| Catalyst make-up rate: Percent per day | 0.52 | 0.52 | 0.52 | 0.32 |
| With steam treatment: | | | | |
| Temp. (° F.) | 900 | 900 | 900 | 900 |
| Pressure (atm.) | 13 | 13 | 13 | 13 |
| Time (hrs.) | 24 | 24 | 24 | 24 |
| Catalyst: | | | | |
| Surface area (m.²/g.) | 187 | 234 | 280 | 234 |
| Pore dia. (A.) | 175 | 175 | 175 | 175 |
| Equilibrium catalyst: Surface area (m.²/g.) | 100 | 125 | 150 | 125 |
| Catalyst make-up rate: | | | | |
| Percent per day | 0.16 | 0.16 | 0.16 | 0.16 |
| Ratio, treated/untreated | 0.31 | 0.31 | 0.31 | 0.50 |

In another embodiment of the instant invention beneficial results are achieved in treating a catalyst in a gelatinous form prior to drying the same to improve its activity and stability. Thus it has been found that subjecting the gelatinous catalytic materials to a temperature of 300 to 575° F. at a pressure between 5-100 atmospheres for a period of time ranging from 1-72 hours will provide in the dried, i.e. solid catalyst pores whose average diameter ranges between 100 to 225 A. Advantageously the dried catalyst treated in its gelatinous form as described above, can also be steam treated in accordance with the methods also outlined above.

What is claimed is:
1. A process for treating a hydrocarbon cracking catalyst in a gelatinous form consisting essentially of heating said gelatinous catalyst at a temperature between about 300 to 575° F. and at a pressure between about 5-100 atmospheres, the pressure selected corresponding substantially to the vapor pressure of water at the temperature selected, for a period of time ranging from about 1-72 hours to produce a gelatinous catalyst having, in the dried form, an average pore diameter ranging between about 100-225 A.

2. The process of claim 1 which includes drying the treated gelatinous catalyst.

3. A hydrocarbon cracking catalyst made in accordance with the process of claim 2.

References Cited

UNITED STATES PATENTS

| 2,698,305 | 12/1954 | Plank et al. | 252—410 X |
| 2,746,935 | 5/1956 | Weisz | 252—410 X |
| 2,773,842 | 12/1956 | Kimberlin et al. | 252—410 X |
| 2,982,719 | 5/1961 | Gilbert et al. | 252—449 X |
| 3,094,384 | 6/1963 | Bertolacini et al. | 252—449 X |

DANIEL E. WYMAN, Primary Examiner

C. F. DEES, Assistant Examiner

U.S. Cl. X.R.

252—449, 455